(12) United States Patent
Chenthamarakshan

(10) Patent No.: US 9,569,774 B2
(45) Date of Patent: Feb. 14, 2017

(54) SYSTEM AND METHOD FOR PROCESSING FEEDBACK ENTRIES RECEIVED FROM SOFTWARE

(71) Applicant: International Business Machines Corporation, Armonk, NY (US)

(72) Inventor: Vijil Enara Chenthamarakshan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 13/855,333

(22) Filed: Apr. 2, 2013

(65) Prior Publication Data

US 2013/0219165 A1  Aug. 22, 2013

Related U.S. Application Data

(63) Continuation of application No. 11/325,719, filed on Jan. 5, 2006, now Pat. No. 8,447,695.

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06F 21/602* (2013.01); *G06Q 20/3827* (2013.01);
(Continued)

(58) Field of Classification Search
CPC ...... G06Q 20/00–20/425; G06Q 30/00–30/08; G06Q 2220/00–2220/18; G06F 21/00–21/645; H04L 9/08–9/16; H04L 9/3236
(Continued)

(56) References Cited

U.S. PATENT DOCUMENTS 5,657,390 A    8/1997  Elgamal et al.
5,892,900 A    4/1999  Ginter et al.
(Continued)

OTHER PUBLICATIONS

Tsudik, Gene, Message Authentication with One-way Hash Functions, Oct. 1992, ACM SIGCOMM Computer Communication Review, ACM New York, NY, vol. 22, Issue 5, pp. 29-38.
(Continued)

*Primary Examiner* — Mohammad A Nilforoush
(74) *Attorney, Agent, or Firm* — Schmeiser, Olsen & Watts, LLP; John Pivnichny

(57) ABSTRACT

A method and system for processing feedback entries received from software provided by a vendor to an end user machine. The end user machine includes the software, a feedback module, and a database. The feedback module: generates an encryption $E_{k0}$ of an identification tag $FE(0)$ using a secret key $k(0)$ where $E_{k0}=E(k(0),FE(0))$; generates a parameter $H_{n0}$ using a secret key $n(0)$ where $H_{n0}=Hash(n(0)\|E_{k0})$; generates a parameter $H_{s0}$ using a secret key $s(0)$ where $H_{s0}=Hash(s(0)\|E_{k0})$; and sends $E_{k0}$, $H_{n0}$, and $H_{s0}$ to the database.

14 Claims, 12 Drawing Sheets

(51) Int. Cl.
 *G06Q 30/02* (2012.01)
 *H04L 9/08* (2006.01)
 *G06F 21/60* (2013.01)
 *H04L 9/12* (2006.01)
 *H04L 9/14* (2006.01)
 *H04L 9/32* (2006.01)

(52) U.S. Cl.
 CPC ............... *G06Q 30/02* (2013.01); *H04L 9/08* (2013.01); *H04L 9/12* (2013.01); *H04L 9/14* (2013.01); *H04L 9/3236* (2013.01); *G06Q 2220/00* (2013.01); *H04L 9/0822* (2013.01); *H04L 2209/38* (2013.01); *H04L 2209/56* (2013.01); *H04L 2209/60* (2013.01)

(58) Field of Classification Search
 USPC ..................................................... 705/50–79
 See application file for complete search history.

(56) References Cited

U.S. PATENT DOCUMENTS

| | | |
|---|---|---|
| 6,842,752 B2 | 1/2005 | Itabashi et al. |
| 6,901,347 B1 | 5/2005 | Murray et al. |
| 2004/0034794 A1 | 2/2004 | Mayer et al. |
| 2004/0139315 A1 | 7/2004 | Tokutani et al. |
| 2004/0210458 A1 | 10/2004 | Evans et al. |
| 2005/0182932 A1 | 8/2005 | Wheeler |
| 2006/0177061 A1* | 8/2006 | Orsini ................... G06F 21/606 380/268 |

OTHER PUBLICATIONS

Notice of Allowance (Mail Date Jan. 14, 2013) for U.S. Appl. No. 11/325,719, filed Jan. 5, 2006, First Named Inventor Vijil Enara Chenthamarakshan, Confirmation No. 7235.
Request for Continuation Examination (RCE) (Jan. 28, 2010) for U.S. Appl. No. 11/325,719, filed Jan. 5, 2006, First Named Inventor Vijil Enara Chenthamarakshan, Confirmation No. 7235.
Final Rejection (Mail Date Nov. 3, 2009) for U.S. Appl. No. 11/325,719, filed Jan. 5, 2006, First Named Inventor Vijil Enara Chenthamarakshan, Confirmation No. 7235.
Response after Non-Final Action (Jul. 1, 2009) for U.S. Appl. No. 11/325,719, filed Jan. 5, 2006, First Named Inventor Vijil Enara Chenthamarakshan, Confirmation No. 7235.
Non-Final Rejection (Mail Date Apr. 1, 2009) for U.S. Appl. No. 11/325,719, filed Jan. 5, 2006, First Named Inventor Vijil Enara Chenthamarakshan, Confirmation No. 7235.
U.S. Appl. No. 13/855,281, filed Apr. 2, 2013, First Named Inventor Vijil Enara Chenthamarakshan, Confirmation No. 1516.

* cited by examiner

SYSTEM AND METHOD FOR PROCESSING FEEDBACK ENTRIES RECEIVED FROM SOFTWARE

This application is a continuation application claiming priority to Ser. No. 11/325,719, filed Jan. 5, 2006.

BACKGROUND OF THE INVENTION

1. Technical Field

The present invention relates to a method and system for processing feedback entries received from software.

2. Related Art

Understanding customer behavior facilitates designing products that are more in tune with customer requirements. As an example, if a vendor finds that a large number of customers are not using the spell checker before sending an email, it may means that the spell check feature should be enabled by default. On the other hand, if a large number of users are dismissing an explicit feature without using the explicit feature, it may mean that the explicit feature is more of an irritant. Currently, most software vendors rely on surveys and interviews to understand customer behavior. However, surveys are often unreliable because survey participants are only a small portion of the installed customer base. Also, survey participants tend to behave differently in survey situations and real life situations.

A situation which may requires immediate attention from software vendors is erroneous program behavior. This includes abnormal terminations, assertion failures, crashes etc. Bugs encountered at customer's site are difficult and expensive to resolve because customers who contact customer support to report such problems often find it difficult to articulate the exact nature of the problem. The customers are also usually not competent to provide accurate information that can help in identifying a problem's cause, such as stack traces, environment etc.

It may be desirable for the software to send error reports to the vendor. If the software product sends error reports to the vendor, the error reports could have useful information such as stack traces, crash dumps, etc., which will help the vendor to respond faster to defects, resulting in faster patch release cycles. Some programs provide the user with an option to send error reports to the vendor. If a known problem occurs, the user is provided a link to the service pack, hotfix or knowledge base article that addresses the issue.

Error reports provide the following benefits to software vendors: helps in early identification of critical issues; provides rich information like stack traces, crash dumps, etc., that is assists in reproducing the problem; and provides timely feedback on patches, hotfixes etc., as soon as the problem is detected.

Since user machines are not always online, information collected by the system for error reporting should be stored in user's machine at least until a network connection is available. However, user machines are prone to attacks and the vendor should be able to provide privacy and security for the user even when machines are compromised. However, providing privacy and security even after the user's machine is compromised is a challenging task which is not addressed by existing systems.

Thus, there is a need for an error reporting system that provides security and privacy for the user even after the user's machine is compromised.

SUMMARY OF THE INVENTION

The present invention provides a method for processing feedback entries received from software, said software provided by a vendor to an end user machine, said end user machine comprising the software, a feedback module, and a database, wherein a concatenation operator || is defined such that A||B denotes a concatenation of strings A and B, wherein $E(K,X)$ defines a symmetric key encryption of a parameter X using a key K, wherein $Hash(Y)$ defines a one way hash function of a parameter Y, wherein said method comprising, as performed by the feedback module:

generating a secret key $k(0)$ and making the key $k(0)$ known to both the vendor and a user of the software;

generating a secret key $n(0)$ and making the key $n(0)$ known to the vendor but not to the user;

generating a secret key $s(0)$ and making the key $s(0)$ known to the user but not to the vendor;

generating an encryption $E_{k0}$ of an identification tag $FE(0)$ such that $E_{k0}=E(k(0),FE(0))$;

generating a parameter $H_{n0}$ such that $H_{n0}=Hash(n(0)||E_{k0})$;

generating a parameter $H_{s0}$ such that $H_{s0}=Hash(s(0)||E_{k0})$;

sending $E_{k0}$, $H_{n0}$, and $H_{s0}$ to the database; and sending $E_{k0}$ and $H_{n0}$ to the vendor.

The present invention provides a computer program product, comprising a computer usable medium having a computer readable program code embodied therein, said computer readable program code comprising an algorithm adapted to implement a method for processing feedback entries received from software, said software provided by a vendor to an end user machine, said end user machine comprising the software, a feedback module, and a database, wherein a concatenation operator || is defined such that A||B denotes a concatenation of strings A and B, wherein $E(K,X)$ defines a symmetric key encryption of a parameter X using a key K, wherein $Hash(Y)$ defines a one way hash function of a parameter Y, wherein said method comprising, as performed by the feedback module:

generating a secret key $k(0)$ and making the key $k(0)$ known to both the vendor and a user of the software;

generating a secret key $n(0)$ and making the key $n(0)$ known to the vendor but not to the user;

generating a secret key $s(0)$ and making the key $s(0)$ known to the user but not to the vendor;

generating an encryption $E_{k0}$ of an identification tag $FE(0)$ such that $E_{k0}=E(k(0),FE(0))$;

generating a parameter $H_{n0}$ such that $H_{n0}=Hash(n(0)||E_{k0})$;

generating a parameter $H_{s0}$ such that $H_{s0}=Hash(s(0)||E_{k0})$;

sending $E_{k0}$, $H_{n0}$, and $H_{s0}$ to the database; and sending $E_{k0}$ and $H_{n0}$ to the vendor.

The present invention provides a process for deploying (or integrating) computing infrastructure, said process comprising integrating computer-readable code into a computing system, wherein the code in combination with the computing system is capable of performing a method for processing feedback entries received from software, said software provided by a vendor to an end user machine, said end user machine comprising the software, a feedback module, and a database, wherein a concatenation operator || is defined such that A||B denotes a concatenation of strings A and B, wherein $E(K,X)$ defines a symmetric key encryption of a parameter X using a key K, wherein $Hash(Y)$ defines a one way hash function of a parameter Y, wherein said method comprising, as performed by the feedback module:

generating a secret key $k(0)$ and making the key $k(0)$ known to both the vendor and a user of the software;

generating a secret key $n(0)$ and making the key $n(0)$ known to the vendor but not to the user;

generating a secret key s(0) and making the key s(0) known to the user but not to the vendor;

generating an encryption $E_{k0}$ of an identification tag FE(0) such that $E_{k0}=E(k(0),FE(0))$;

generating a parameter $H_{n0}$ such that $H_{n0}=Hash(n(0)\|E_{k0})$;

generating a parameter $H_{s0}$ such that $H_{s0}=Hash(s(0)\|E_{k0})$;

sending $E_{k0}$, $H_{n0}$, and $H_{s0}$ to the database; and sending $E_{k0}$ and $H_{n0}$ to the vendor.

The present invention advantageously provides an error reporting system that provides security and privacy for the user even after the user's machine is compromised.

DETAILED DESCRIPTION OF THE INVENTION

Figure 1:
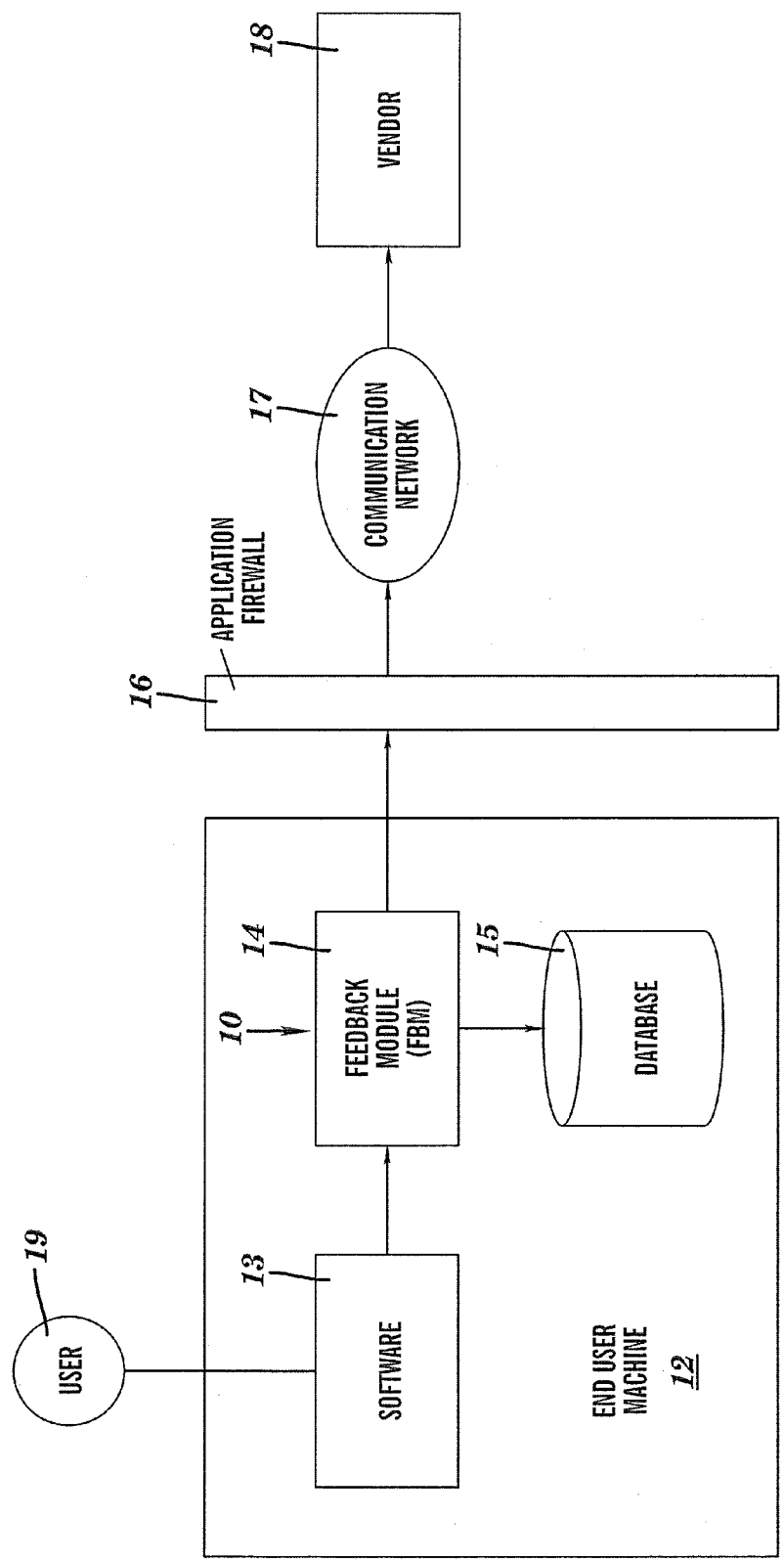
FIG. 1 depicts a system for processing feedback entries received from software provided by a vendor to an end user machine, in accordance with embodiments of the present invention.

The present invention provides a secure way of collecting program usage statistics that also protects the privacy of individual users, by using an application firewall, a separate feedback module, a secure database and a special purpose cryptographic protocol. Apart from protecting users from malicious attackers, the present invention also prevents the software vendor from misleading the user on what information was sent to its site for analysis. In other words, the present invention treats even the software vendor as a potential adversary. Also, the present invention invention describes a mechanism that provides security and privacy even when the user's system is taken over by an adversary.

By using this present invention, users will have exact control over the data that is sent to the vendor and will facilitate a huge increase in adoption of automated feedback and error reporting. In fact, when users become more and more aware of online privacy issues, they will insist that all automated feedback and error reporting systems should include mechanisms that provide security and privacy.

The present invention provides an automated feedback and error reporting system that is not too invasive, so that software vendors may employ prudence while deciding what information is collected. In addition, the present invention enables the user to have a fool proof way to ensure that the privacy policy agreed upon by the vendor is kept, so that if there is a breach of privacy, the user would be able to detect the breach.

The present invention enables users to periodically check for privacy policy violations, so that the user may read at any time the information that was sent to the vendor, and nobody other than the vendor and the user are able to read the information that was sent by the software. The vendor is able to verify that all information that was received was actually sent by the software and was not modified in transit. The system is able to function (with all the privacy and security guarantees) even when there is no network connection available to communicate with the vendor.

User machines are prone to attacks and the feedback module of the present invention is able to provide privacy and security even when user machines are compromised. As a first example, if the vendor attacks the user machine and the user's machine is compromised as a result, the vendor should not be able to modify or delete information that was collected (and kept in user's machine) before the compromise and escape detection by the user. As a second example, if the user machine is compromised, any attacker (other than the vendor) should not be able to read the information collected from the user before the compromise. As a third example, if the user machine is compromised, the attacker should not be able to modify or delete information collected from the user before the compromise and escape detection by the vendor or user.

A concatenation operator $\|$ is defined such that $A\|B$ denotes a concatenation of character strings A and B. For example if A="abc" and B="xyz" then $A\|B$="abcxyz".

E(K,X) is defined as a symmetric key encryption of a parameter X using a key K. E(K,X) results from use of an encryption algorithm such as Data Encryption Standard (DES) or Advanced Encryption Standard (AES), wherein the data cannot be decrypted without the knowledge of the key k.

Hash(Y) is defined as a one way hash function of a parameter Y using a hash algorithm such as MD5 (RFC1321) or SHA1 (RFC3174). Hash(Y) has the following properties: given the Hash(M), it is difficult to find the message M. Hash(Y) is preimage resistant: given a message M1, it is difficult to find another message M2 such that Hash(M1)=Hash(M2). Hash(Y) is collision resistant: it is difficult to find two messages M1 and M2 such that Hash(M1)=Hash(M2).

FIG. 1 depicts a system 10 for processing feedback entries received from software 13 provided by a vendor 18 to an end user machine 12, in accordance with embodiments of the present invention. The vendor 18 comprises the vendor's computing site which includes, inter alia, a server of the vendor 18. The end user machine 12, which comprises a computer or computer system, includes a feedback module (FBM) 14, a database 15, and the software 13. The database 15 is a secure database due to security features of the present invention as described infra. The feedback module 14 is connected to the vendor 18 via a communication network 17 (e.g., the Internet). The communication network 17 is disposed between the end user machine 12 and the vendor 18. A user 19, who uses the software 13 provided by the vendor 18, may be online with respect to the end user machine 12.

Access by feedback module 14 to the communication network 17 is controlled by an application firewall 16 which is disposed between the end user machine 12 and the communication network 17. The application firewall 16 is adapted to permit access by the feedback module 14 to the communication network 17. The application firewall 16 is adapted to prevent access by the software to the communication network 17. Accessing the communication network 17 comprises sending data to the communication network 17 and/or receiving data from the communication network 17. The application firewall 16 consults its internal rule database before allowing any application to access the communication network 17. Examples of application firewalls include Zone Labs Integrity Desktop.

The system 10 comprises the feedback module 14 and the database 15.

The software 13, which is installed by the vendor 18 in the end user machine 12, is prevented from directly accessing the vendor 18 by the application firewall 16. Instead, the feedback module 14 communicates with the vendor 18. When the software 13 has information to send to the vendor 18, the software 13 sends the information to the feedback module 14 as feedback entries. It is assumed herein that the vendor has knowledge of the format used to encode the feedback entries. The feedback module 14 provides security and privacy for the user 19. The feedback module 14 writes the feedback entries to the database 15 after following a protocol described infra. Then, if a network connection from the feedback module 14 to the vendor 18 is available, the feedback module 14 follows a synchronization protocol (see FIG. 8) to sync the contents of the database 15 with the vendor 18. The application firewall 16 is configured to allow the feedback module 14 to connect to the vendor 18 and to prevent all other programs from accessing the vendor 18. If the synchronization is successful, the vendor 18 can verify the integrity of data received by the vendor 18 by following the algorithm given in FIG. 9. The user can verify whether or not all the security requirements are met by following the algorithm given in FIG. 10.

Figure 2:
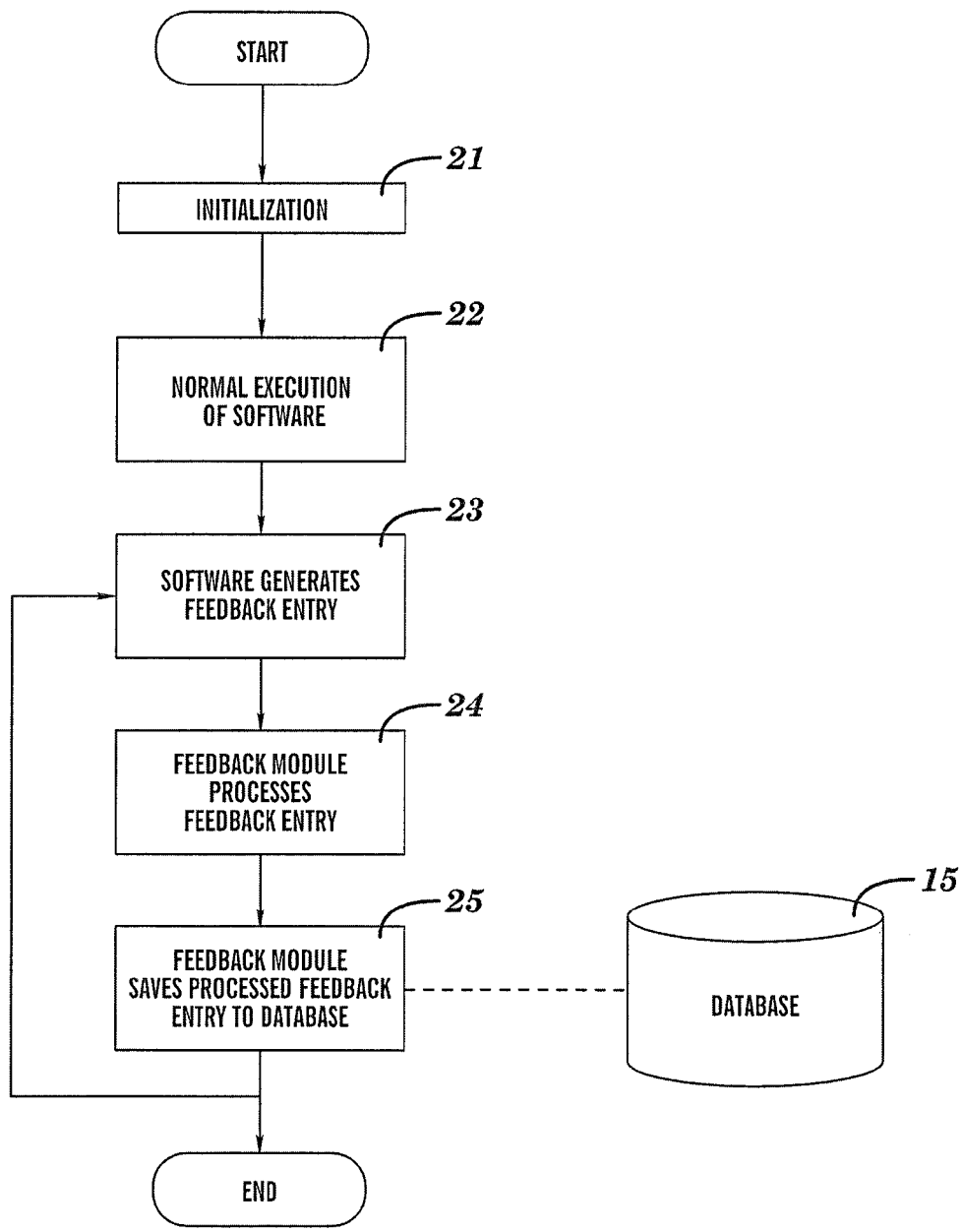
FIG. 2 is a flow chart depicting operation of the system of FIG. 1, in accordance with embodiments of the present invention.

FIG. 2 is a flow chart depicting the operation of the system 10 of FIG. 1, in accordance with embodiments of the present invention. The flow chart of FIG. 2 comprises steps 21-25. Step 21 provides initializations, including setup of secret keys and setup of the database 15 to be secure for the feedback module 14 and the vendor 18. Step 22 executes the software 13. The feedback module 14 executes a loop comprising steps 23-25, wherein each pass through the loop performs operations on feedback entries generated by the software 13. In step 23, the software 13 generates feedback entries which are processed by the feedback module 14 in step 24. In step 25, the feedback module 14 writes the processed feedback entries to the database 15.

Figure 3:
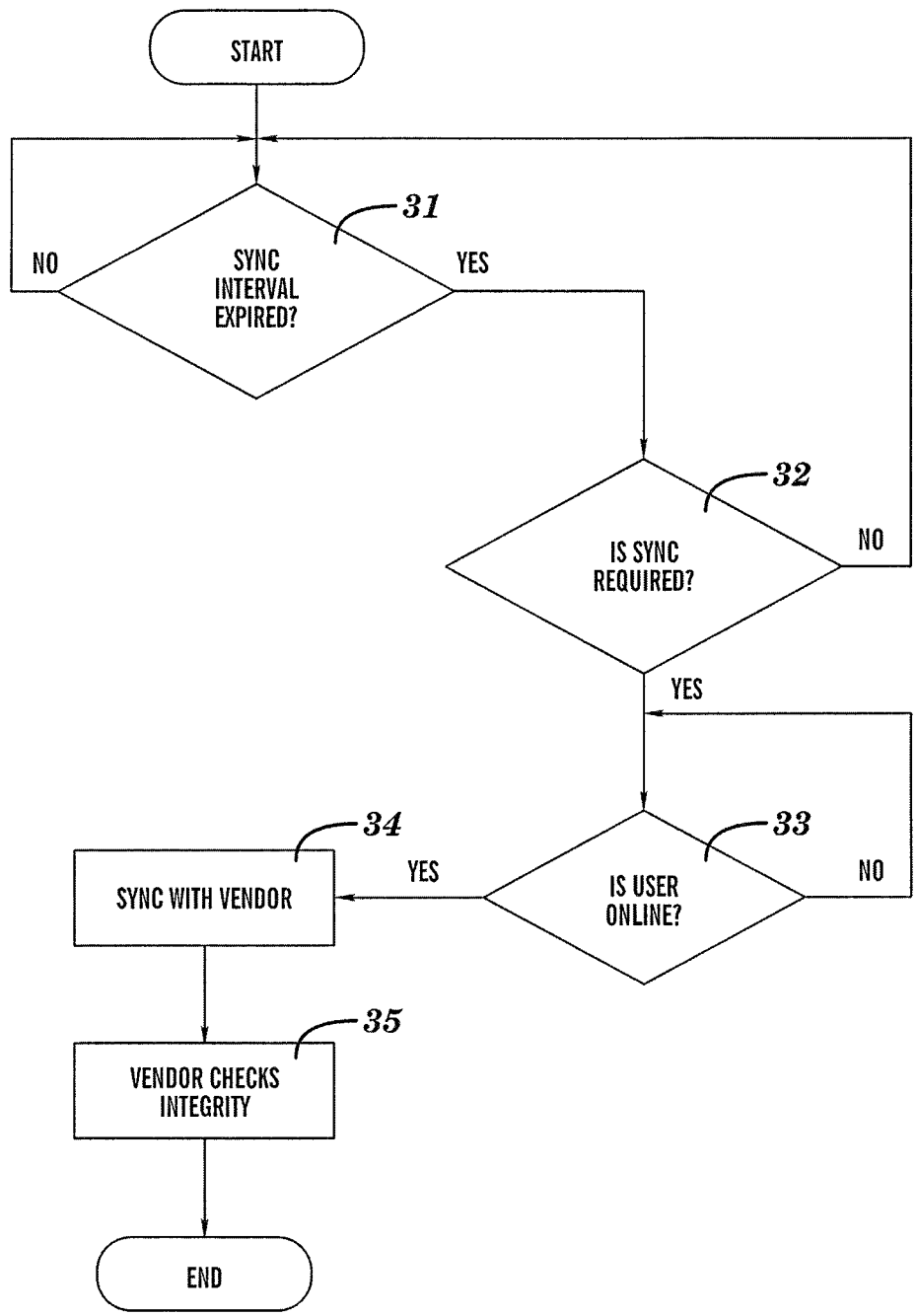
FIG. 3 is a flow chart depicting periodic synchronization of the contents of a database with the vendor of FIG. 1, in accordance with embodiments of the present invention.

FIG. 3 is a flow chart depicting periodic synchronization of the contents of the database 15 with the vendor 18 of FIG. 1, in accordance with embodiments of the present invention. The synchronization is performed by the feedback module 14 periodically in accordance with a specified synch interval of time. The sync interval may be specified by vendor 18 or chosen by the user 19. The flow chart of FIG. 3 comprises steps 31-35. The process loops through step 31 until it is determined that the current synch interval has expired so that a synchronization may next be performed. Step 32 determines whether a synchronization is required. For example, a synchronization is required if the feedback module 14 has received a feedback entry from the software 13 since the last synchronization. If a synchronization is not required, then the process returns to step 31. If a synchronization is required, then step 33 is performed. The process loops through step 33 until it is determined that the user 19 is online with respect to the end user machine 12, which triggeres execution of step 34. In step 34, the feedback module 14 synchronizes the contents of the database 15 with the vendor 18, as described infra in conjunction with FIG. 8. In step 35, the vendor 18 checks the integrity of the data received by the vendor 18, as described infra in conjunction with FIG. 9.

The feedback module 14 receives messages (feedback entries which could include usage statistics, error reports etc.) from the software 13 and writes the messages to the database 15 (which is secure) to assure security and privacy. The cryptographic protocols that support the security and privacy involve various interactions between the various entities. The entities are: the vendor 18 who can be contacted through the public Internet but access to whom is denied to all software programs except the feedback module 14 by the application firewall 16; the user 19 of the software 13 provided by the vendor 18; and the feedback module 14 which is a software program which interacts with the software 13 provided by the vendor 18.

Figure 4:
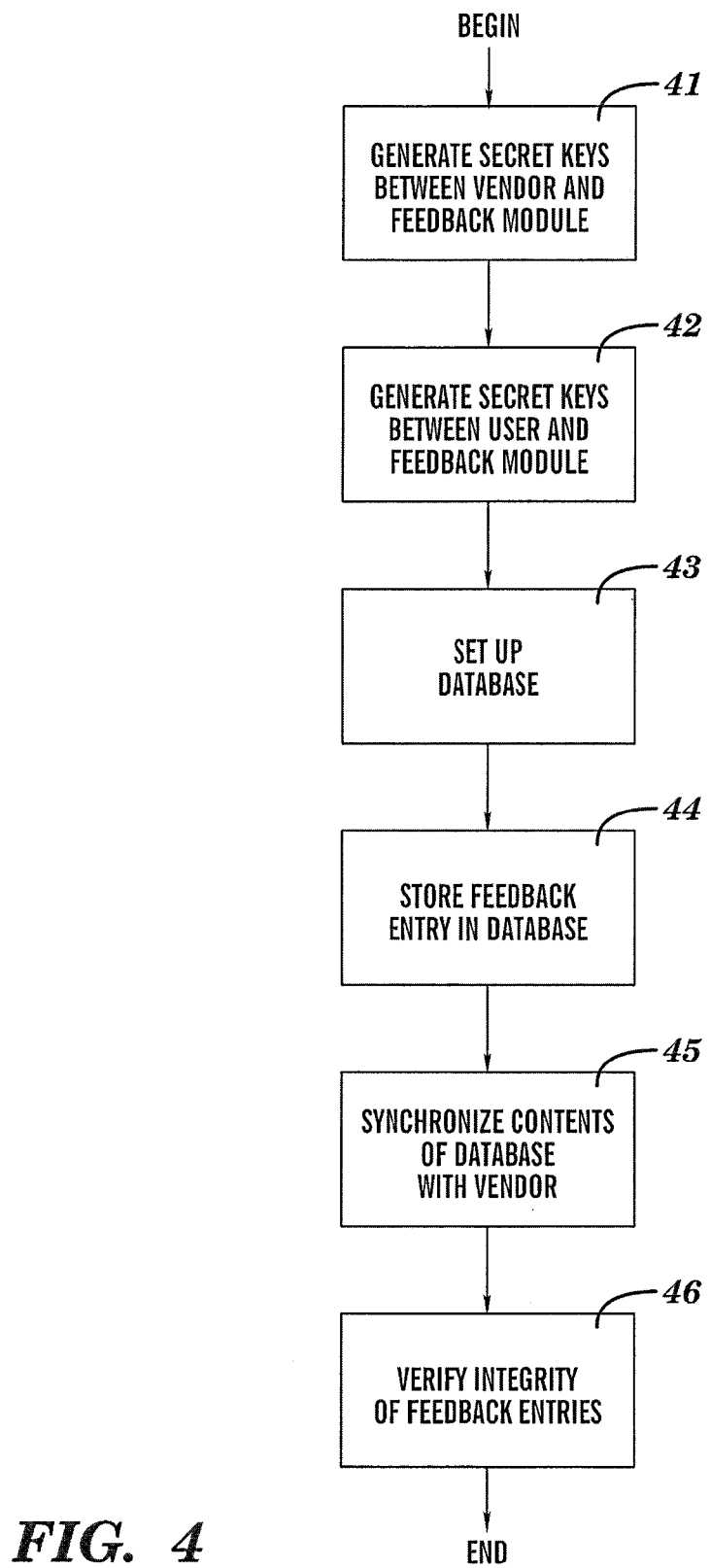
FIG. 4 is a flow chart depicting operation of the system of FIG. 1, in accordance with embodiments of the present invention.

FIG. 4 is a flow chart depicting operation of the system 10 of FIG. 1, in accordance with embodiments of the present invention. The flow chart of FIG. 4, which is more detailed than the flow chart of FIG. 2, comprises steps 41-46.

Step 41 of FIG. 4 generates secret keys between the vendor 18 and the feedback module 14. In step 41, the feedback module 14 establishes two secret keys, namely $k(0)$ and $n(0)$, that are shared between the feedback module 14 and the vendor 18. Generation of keys $k(0)$ and $n(0)$ can be done using a public key algorithm such as, inter alia, Diffie-Hellman key exchange. Alternatively, if the public key of the vendor 18 is available to the feedback module 14 as a public key certificate, then the keys $k(0)$ and $n(0)$ can be negotiated using a protocol such as Secure Sockets Layer (SSL). The feedback module 14 makes the secret key $k(0)$ available to both the vendor 18 and the user 19. In general, any method known to a person of ordinary skill in the art for establishing two secret keys is within the scope of the present invention.

The feedback module 14 also generates an identification tag, denoted illustratively as FBM_ID, that helps in uniquely identifying this installation of the software 13 with the vendor 18. This identification tag could be the serial number of the software, version number for the software, a combination of the serial number of the software and the version number of the software, etc. The feedback module 14 discloses this identification tag to the user 19.

The same feedback module 14 could support multiple vendors (e.g., two or more vendors) such that two secret keys are generated for each vendor of the multiple vendors.

In step 42 of FIG. 4, the feedback module 14 generates a secret key $s(0)$ for use between the user 19 and the feedback module 14. The feedback module 14 discloses the secret key $s(0)$ to the user 19. The secret key $s(0)$ can be derived, inter alia, from a password that is known only to the user 19, by hashing the password using a one way hash function.

Figure 5:
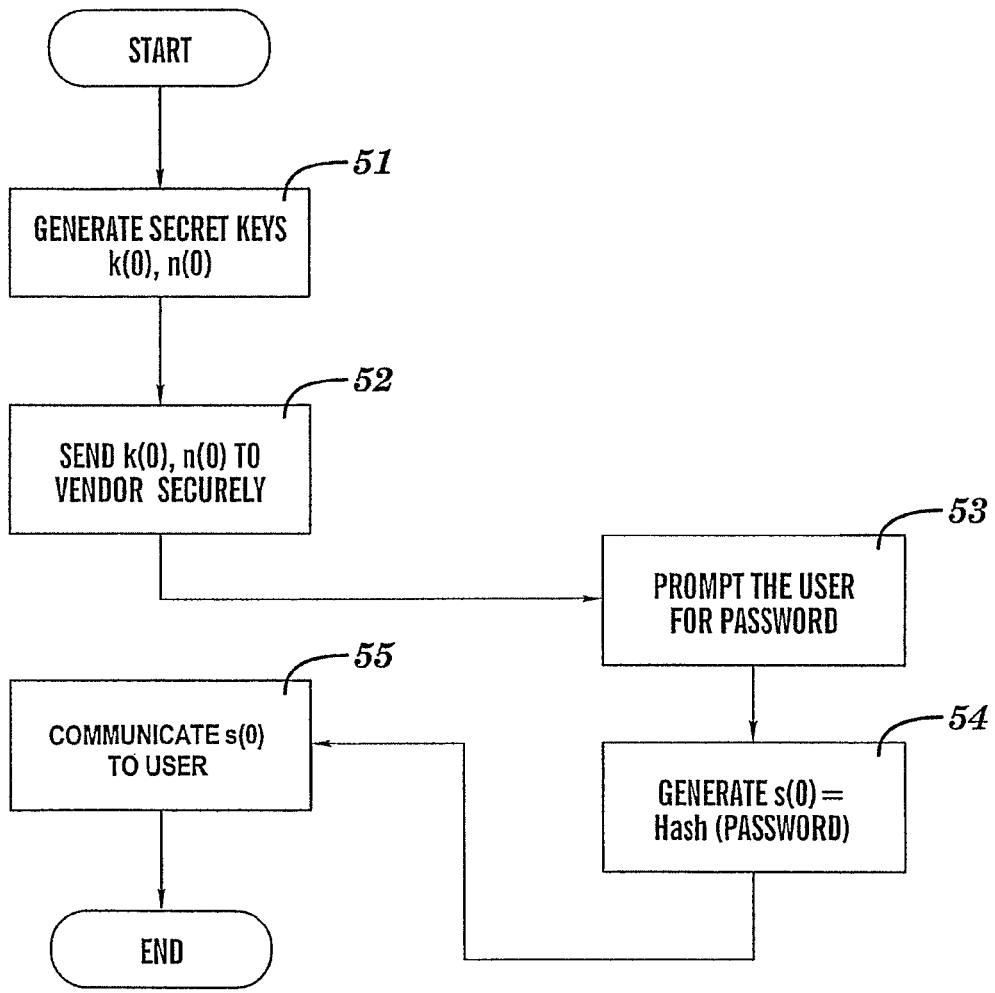
FIG. 5 is a flow chart depicting generation of secret keys, in accordance with embodiments of the present invention.

FIG. 5 is a flow charting depicting steps 41 and 42 of FIG. 4, wherein steps 41-42 generate the secret keys $k(0)$ and $n(0)$ (step 41) and $s(0)$ (step 42). The flow chart of FIG. 5 comprises steps 51-55. Step 51 generates the secret keys k(0) and n(0). Step 52 sends the generated secret keys k(0) and n(0) to the vendor 18 securely and communicates the secret key k(0) to the user 19 but does not communicate the secret key n(0) to the user 19. Step 53 prompts the user 19 for a password "P". Step 54 generates the secret key s(0) as a hash of the password P (i.e., as Hash(P)). Step 55 communicates the secret key s(0) to the user 19, but does not communicate the secret key s(0) to the vendor 18.

Note that after steps 41 and 42 of FIG. 4 are performed, the secret keys k(0), n(0), and s(0) are known as follows. The key k(0) is known to the feedback module 14, the vendor 18, and the user 19. The key n(0) is known to the feedback module 14 and the vendor 18. The key s(0) is known to the feedback module 14 and the user 19. The keys k(0), n(0), and s(0), as well as all other keys described herein, may be in a character string format.

Figure 6A:
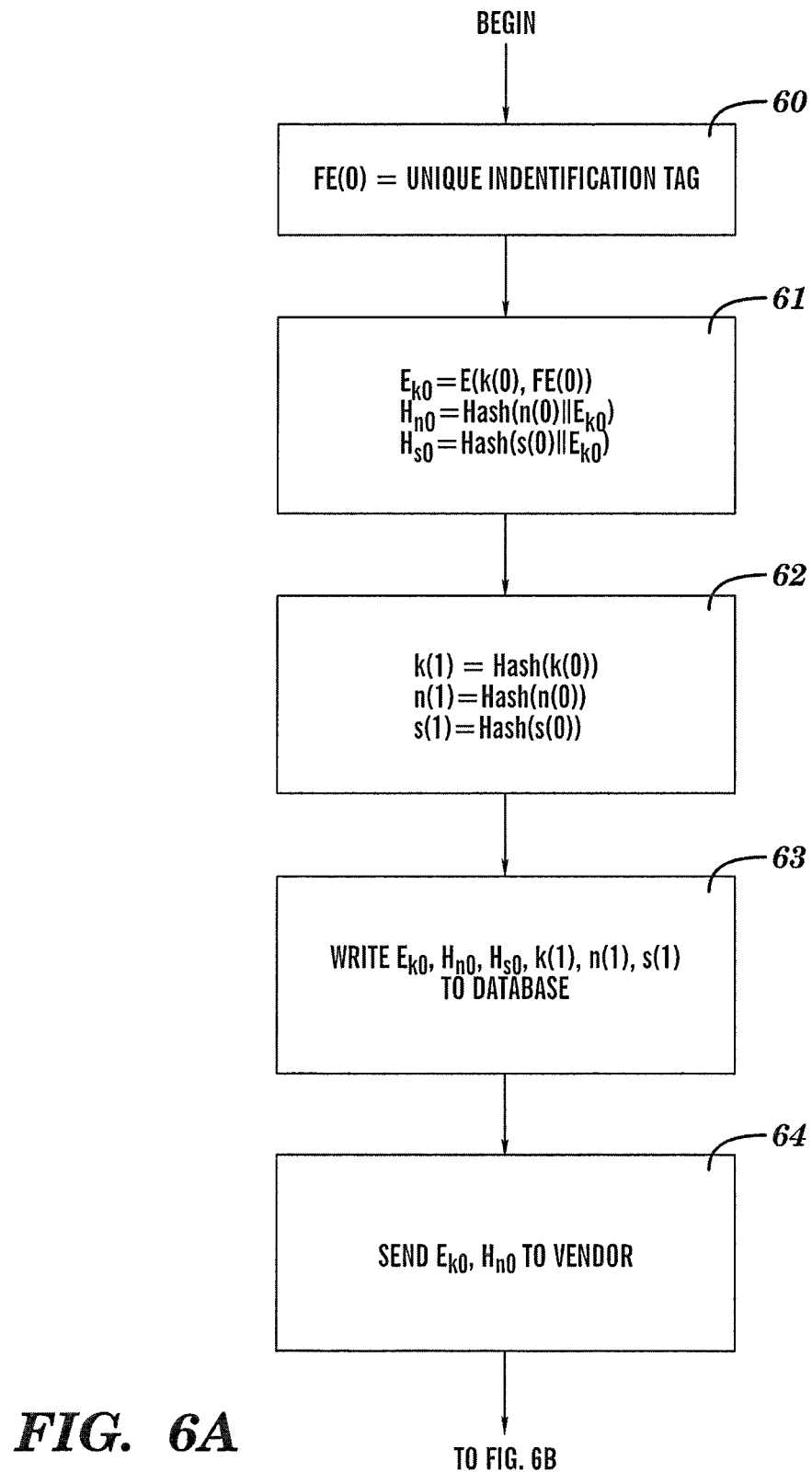
FIGS. 6A and 6B is a flow chart depicting setting up the database of FIG. 1, in accordance with embodiments of the present invention.
Figure 6B:
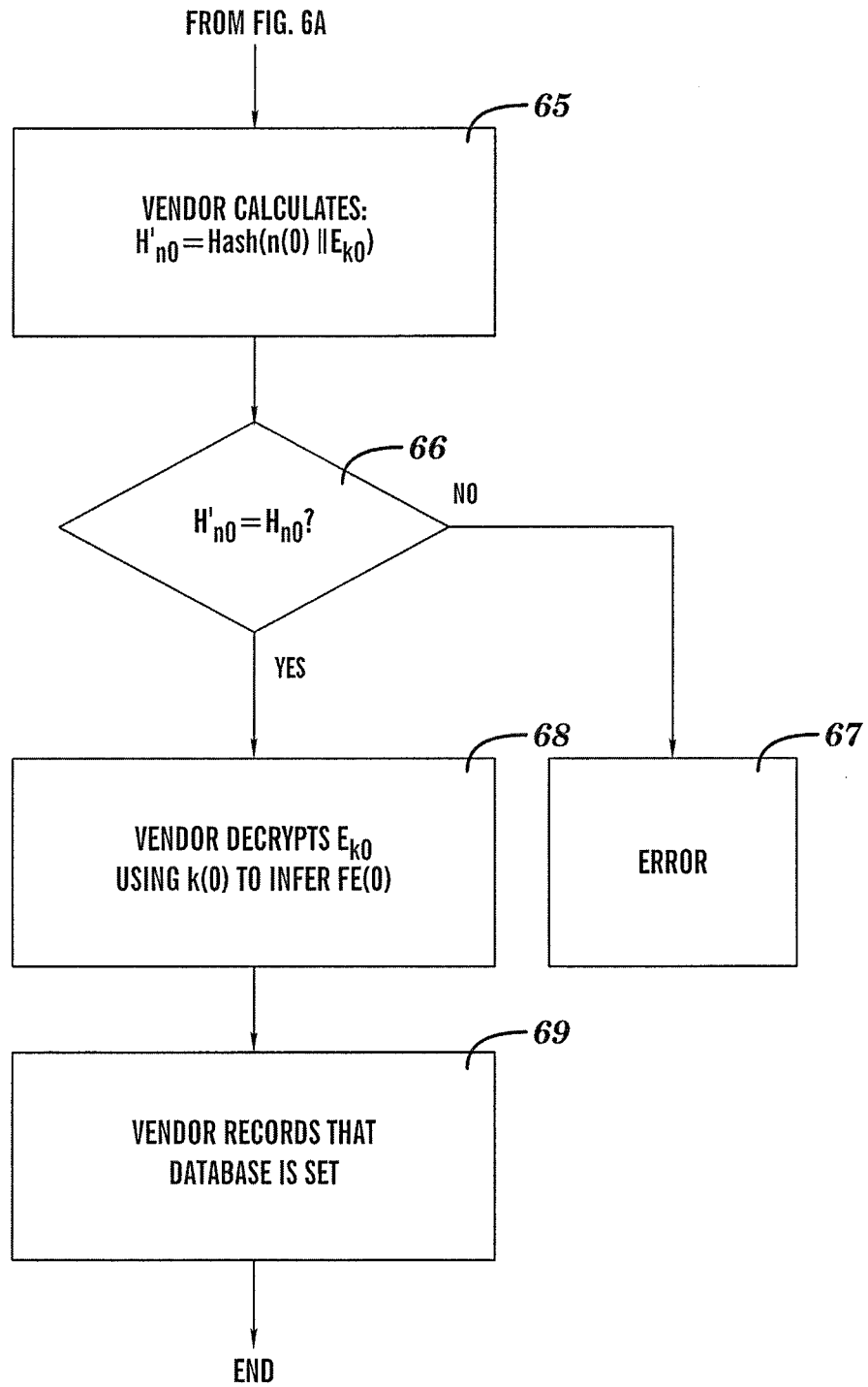

Step 43 of FIG. 4 sets up the database 15, which is described in a flow chart in FIGS. 6A and 6B (collectively, "FIG. 6"), in accordance with embodiments of the present invention. The flow chart of FIG. 6 comprises steps 60-69. The feedback module 14 performs steps 60-64 (FIG. 6A), and the vendor 18 performs steps 65-69 (FIG. 6B).

In step 60, the feedback module 14 sets parameter FE(0) equal to the identification tag denoted illustratively as FBM_ID. In step 61, the feedback module 14 calculates parameters $E_{k0}$, $H_{n0}$, and $H_{s0}$:

$$E_{k0}=E(k(0),FE(0))$$

$$H_{n0}=\text{Hash}(n(0)\|E_{k0})$$

$$H_{s0}=\text{Hash}(s(0)\|E_{k0})$$

In step 62, feedback module 14 generates keys k(1), n(1), and s(1):

$$k(1)=\text{Hash}(k(0))$$

$$n(1)=\text{Hash}(n(0))$$

$$s(1)=\text{Hash}(s(0))$$

In step 63, the feedback module 14 writes $E_{k0}$, $H_{n0}$, $H_{s0}$, k(1), n(1), and s(1) to the database 15.

In step 64, the feedback module 14 sends $E_{k0}$ and $H_{n0}$ to the vendor 18.

In step 65, the vendor 18 calculates $H'_{n0}=\text{Hash}(n(0)\|E_{k0})$ from $E_{k0}$ received by the vendor 18, using the key n(0) in the possession of the vendor 18. Step 66 determines whether the vendor-calculated $H'_{n0}$ matches the $H_{n0}$ received by the vendor 18 from the feedback module 14 as a result of step 64. If step 66 determines that $H'_{n0}$ does not match $H_{n0}$, then an error or a breach of security has occurred and the process stops in step 67. If step 66 determines that $H'_{n0}$ matches $H_{n0}$, then step 68 is executed in which the vendor 18 decrypts $E_{k0}$ using the key k(0) from which FE(0) is determined. In step 69, the vendor 18 records that the database 15 is set. Since n(0) is known only to the vendor 18 and the feedback module 14, the vendor 18 has determined that $E_{k0}$ was properly received from the feedback module 14 via step 64.

Figure 7:
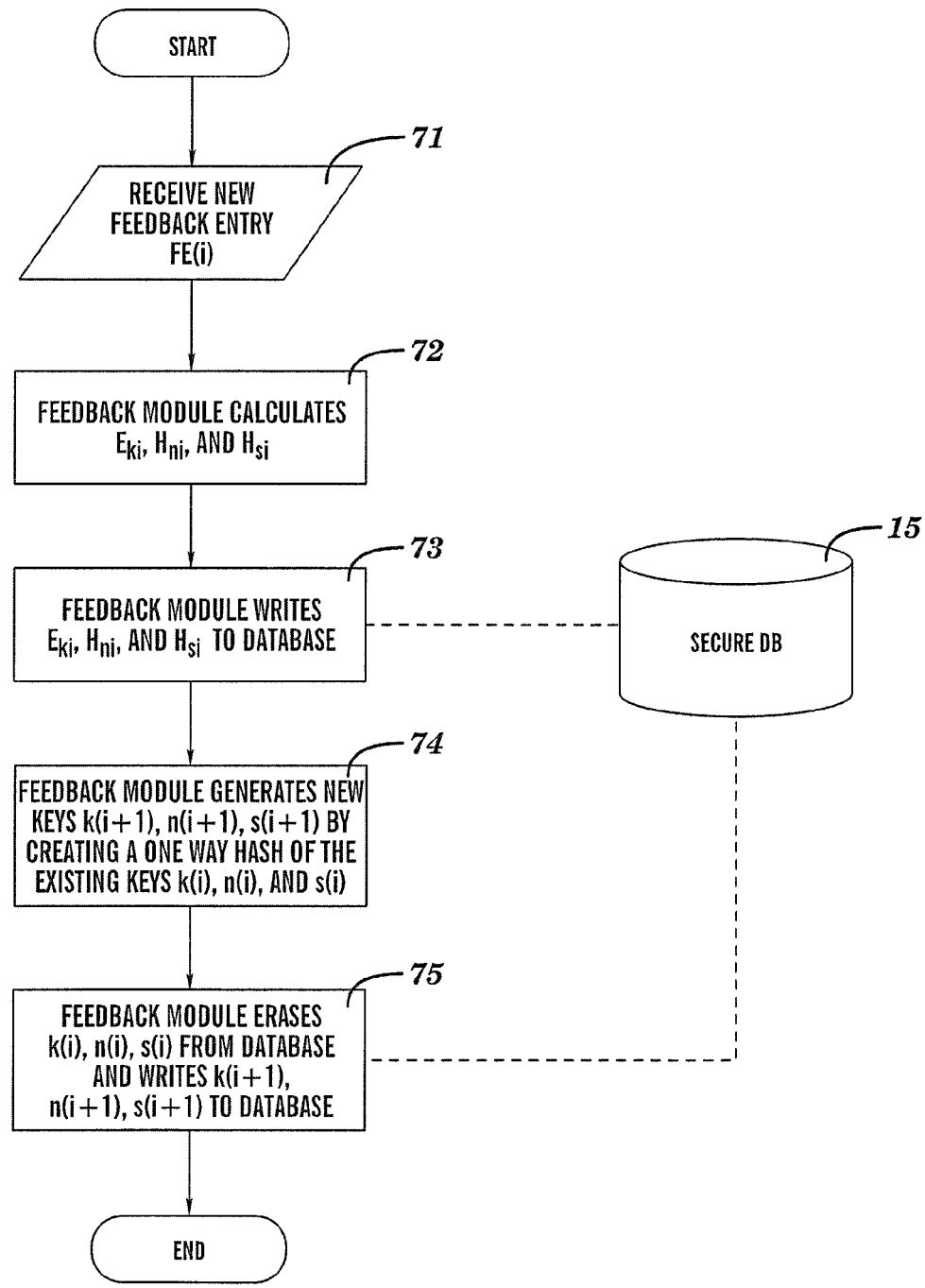
FIG. 7 is a flow chart depicting storing a feedback entry in the database of FIG. 1, in accordance with embodiments of the present invention.

In step 44 of FIG. 4, the feedback module 14 stores a feedback entry in the database 15, which is described in detail in a flow chart in FIG. 7, in accordance with embodiments of the present invention. The flow chart of FIG. 7 comprises steps 71-75, which are performed by the feedback module 14. In step 71, the feedback module 14 receives a new feedback entry FE(i) from the software 13, wherein i=1 for the first such new feedback entry FE(i). In step 72, the feedback module 14 calculates parameters $E_{ki}$, $H_{ni}$, and $H_{si}$:

$$E_{ki}=E(k(i),FE(i))$$

$$H_{ni}=\text{Hash}(n(i)\|E_{ki})$$

$$H_{si}=\text{Hash}(s(i)\|E_{ki})$$

In step 73, the feedback module 14 writes $E_{ki}$, $H_{ni}$, and $H_{si}$ to the database 15. In step 74, the feedback module 14 generates new keys k(i+1), n(i+1), and s(i+1):

$$k(i+1)=\text{Hash}(k(i))$$

$$n(i+1)=\text{Hash}(n(i))$$

$$s(i+1)=\text{Hash}(s(i))$$

In step 75, the feedback module 14 replaces k(i), n(i), and s(i) with keys k(i+1), n(i+1), s(i+1), respectively, in the database 15. For example, the feedback module 14 may erase keys k(i), n(i), and s(i) from the database 15 and write keys k(i+1), n(i+1), s(i+1) to the database 15.

Steps 71-75 are executed for each new feedback entry received by the feedback module 14 from the software 13. If N such new feedback entries are processed by the feedback module 14, then after the N new feedback entries have been processed in accordance with steps 71-75, the database 15 will comprise $E_{ki}$, $H_{ni}$, and $H_{si}$ and for i=1, 2, . . . , N, and the database 15 will additionally comprise k(N+1), n(N+1), and s(N+1).

Figure 8:
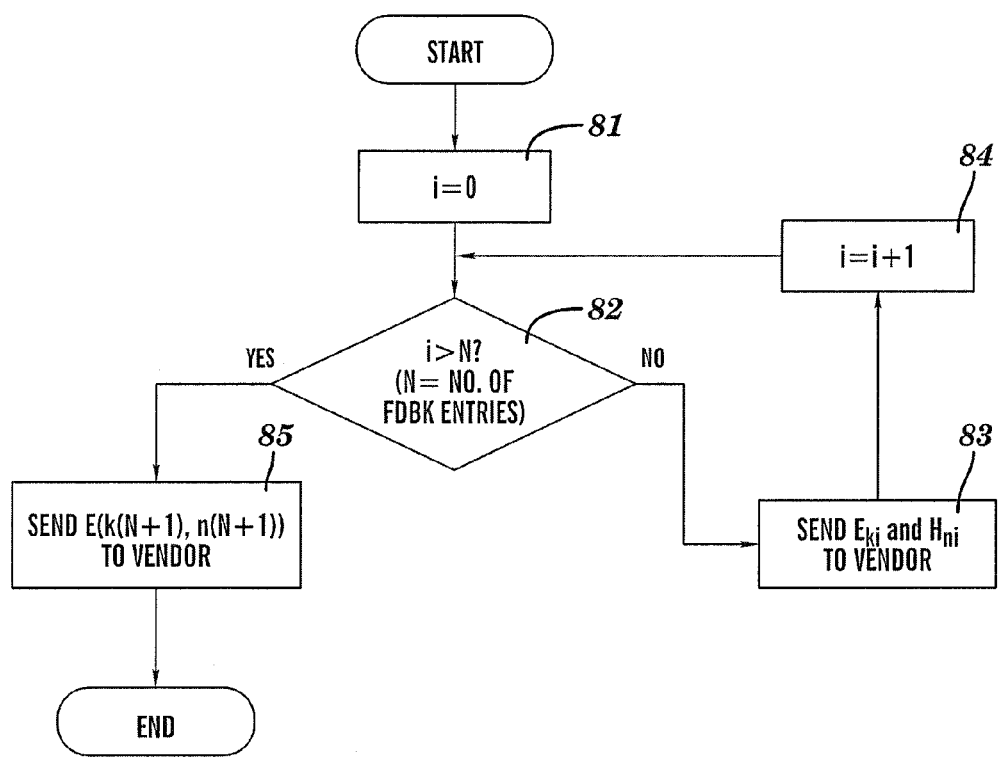
FIG. 8 is a flow chart depicting synchronizing contents of the database with the vendor of FIG. 1, in accordance with embodiments of the present invention.

In step 45 of FIG. 4, the feedback module 14 synchronizes contents of the database 15 with the vendor 18, which is described in detail in a flow chart in FIG. 8, in accordance with embodiments of the present invention. The flow chart of FIG. 8 comprises steps 81-85, which are performed periodically by the feedback module 14.

Step 81 sets an index i equal to 0. Steps 82-84 define a loop in which the index i is executed from i=0 to i=N, wherein N is the number of feedback entries in the database 15. The index i is a feedback entry index for i=1, 2, . . . , N. Step 82 tests for the end of the loop (i.e., for i>N). If step 82 determines that i is not greater than N, then step 83 is next executed and sends $E_{ki}$ and $H_{ni}$ to the vendor 15, followed by incrementing i by 1 in step 84 to complete the $i^{th}$ iteration of the loop. If step 82 determines that i>N, then step 85 is next executed to send an encryption of n(N+1), using the key k(N+1), to the vendor 18 which ends the synchronization process, said encryption sent to the vendor 18 being expressed as E(k(N+1), n(N+1)).

Alternatively, instead of sending all the feedback entries in the database 15 to the vendor 18, the synchronization protocol can send only those feedback entries that were added since the last synchronization.

Figure 9:
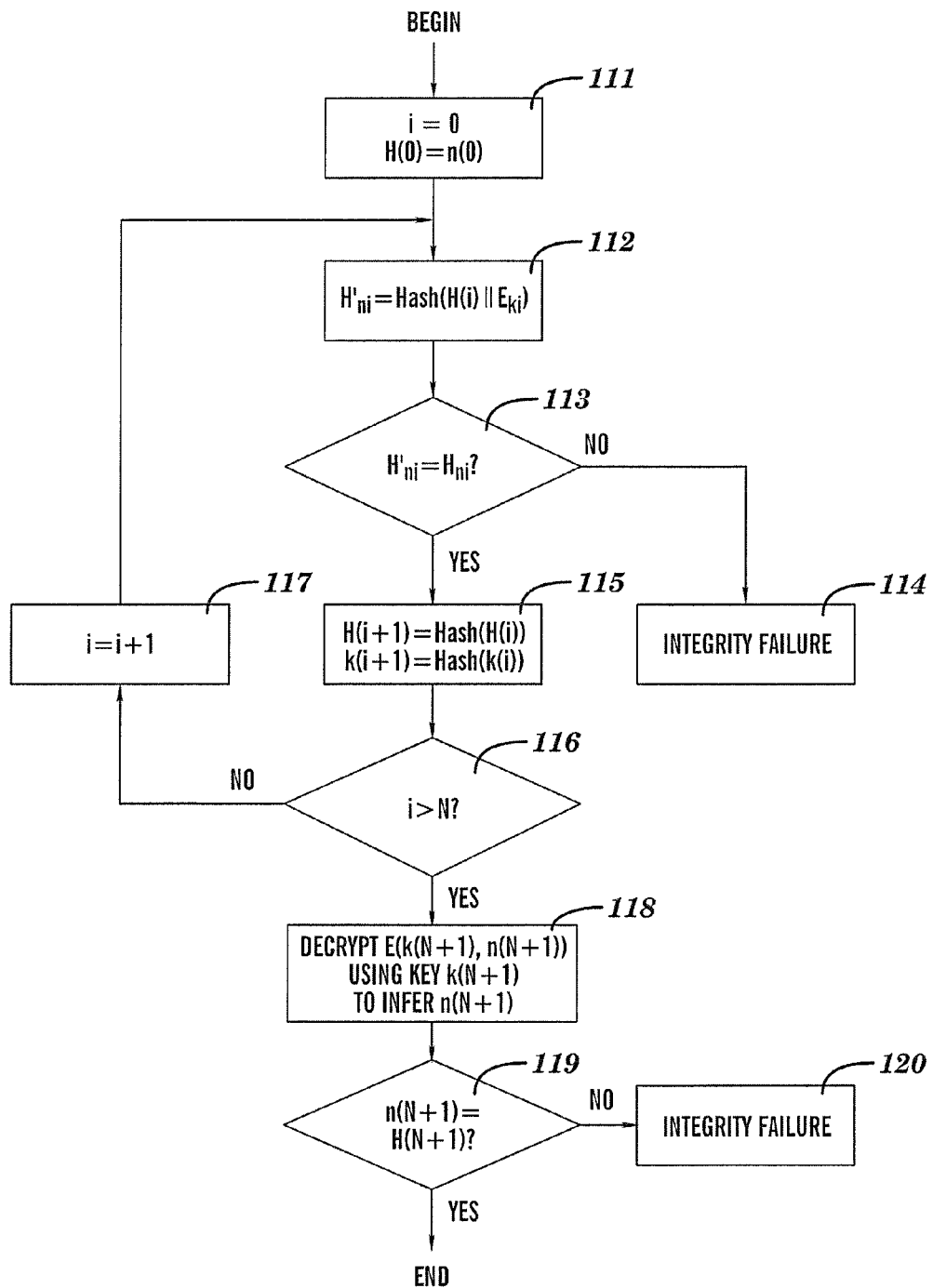
FIG. 9 is a flow chart describing verification, by the vendor of FIG. 1, of the integrity of the feedback entries received by the vendor, in accordance with embodiments of the present invention.
Figure 10:
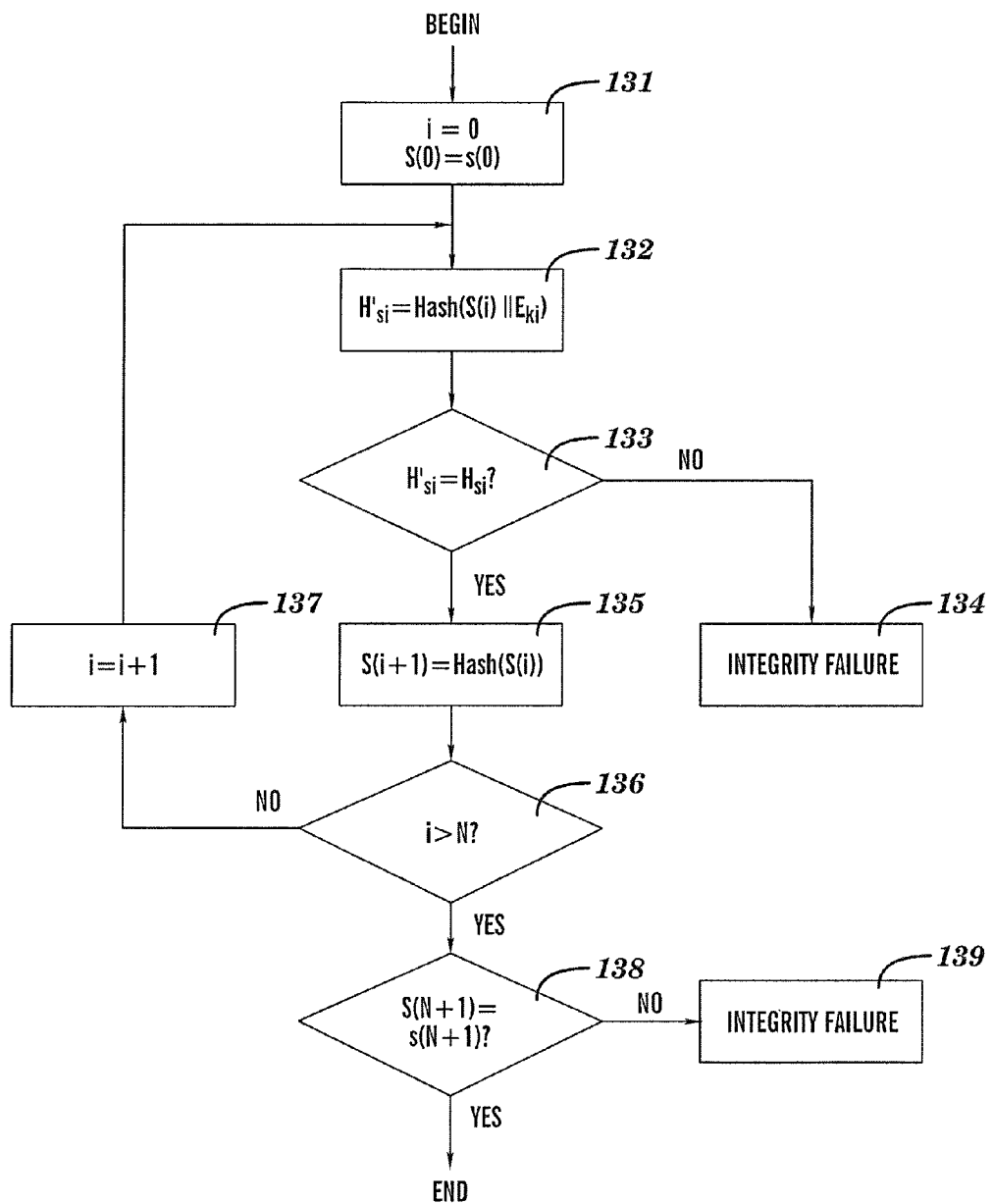
FIG. 10 is a flow chart describing verification, by the user of FIG. 1, of the integrity of the feedback entries in the database, in accordance with embodiments of the present invention.

In step 45 of FIG. 4, the integrity of the feedback entries are verified by the vendor 18 (see FIG. 9) and by the user (see FIG. 10).

FIG. 9 is a flow chart describing verification of the integrity of the feedback entries received by the vendor 18, in accordance with embodiments of the present invention. The flow chart of FIG. 9 comprises steps 111-120, which are performed by the vendor 18. The inputs to the process of FIG. 9 are the following parameters previously received by the vendor 18:

(1) keys n(0) and k(0) from step 41 of FIG. 4;
(2) $E_{k0}$ and $H_{n0}$ from step 64 of FIG. 6A;
(3) N=number of feedback entries received by vendor 18
(4) $E_{ki}$ and $H_{ni}$ (i=1, 2, . . . , N) from step 83 of FIG. 8; and
(5) E(k(N+1),n(N+1)) from step 85 of FIG. 8.

Step 111 initializes an iteration index i to 0 and calculates H(0):

$$H(0)=n(0) \text{ (using the input key } n(0))$$

Next, a loop comprising steps 112-117 is executed.
Step 112 calculates $H'_{ni}$:

$$H'_{ni}=\text{Hash}(H(i)\|E_{ki})$$

using the input $E_{k0}$ if i=0 or the input $E_{ki}$ if i>1, and using H(0) from step 111 if i=0 or H(i) from step 115 of previous iteration of the loop if i>0.

Step 113 determines whether $H'_{ni}$ is equal to $H_{ni}$, using the input $H_{n0}$ if i=0 or the input $H_{ni}$ if i>1. If step 113 determines that $H'_{ni}$ is unequal to $H_{ni}$ then step 114 is executed wherein step 114 announces that an integrity failure has occurred. If step 113 determines that $H'_{ni}=H_{ni}$ then step 115 is next executed.

Step 115 calculates:

$$H(i+1)=\text{Hash}(H(i)) \text{ and}$$

$$k(i+1)=\text{Hash}(k(i))$$

The computation of k(i+1) uses the input key k(0) if i=0 or uses k(i) from step 115 of the previous iteration of the loop if i>0.

Step 116 ascertains whether to exit the loop by determining whether i>N. If step 116 determines that i does not exceed N, then step 117 is executed to increment i by 1, followed by looping back to step 112 to perform the next iteration of the loop. If step 116 determines that i>N, then the loop is exited and step 118 is next performed.

Step 118 decrypts E(k(N+1), n(N+1)) (input from step 85 of FIG. 8), using the key k(N+1) from step 115 of the last iteration of the loop, to infer n(N+1).

Step 119 determines whether the inferred n(N+1) equals H(N+1), wherein H(N+1) was calculated in step 115 of the last iteration of the loop. If step 119 determines that n(N+1) does not equal H(N+1) then step 120 is executed wherein step 120 announces that an integrity failure has occurred. If step 119 determines that n(N+1)=H(N+1) then the verification by the vendor 18 ends.

FIG. 10 is a flow chart describing verification of the integrity of the feedback entries in the database 15, in accordance with embodiments of the present invention. The flow chart of FIG. 10 comprises steps 131-139, which are performed by the user 19. The inputs to the process of FIG. 9 are the following parameters previously inserted into the database 15 by the feedback module 14:

(1) key s(0) from step 42 of FIG. 4;
(2) $E_{k0}$ and $H_{s0}$ from step 63 of FIG. 6A;
(3) N=number of feedback entries in database 15
(4) $E_{ki}$ and $H_{si}$ (i=1, 2, . . . , N) from step 73 of FIG. 7;
(5) s(N+1) from step 75 of FIG. 7

Step 131 initializes an iteration index i to 0 and calculates S(0):

$$S(0)=s(0) \text{ (using the input key } s(0))$$

Next, a loop comprising steps 132-137 is executed.
Step 132 calculates $H'_{si}$:

$$H'_{si}=\text{Hash}(S(i)\|E_{ki})$$

using the input $E_{k0}$ if i=0 or the input $E_{ki}$ if i>1, and using S(0) from step 131 if i=0 or S(i) from step 135 of the previous iteration of the loop if i>0.

Step 133 determines whether $H'_s$ is equal to $H_{si}$, using the input $H_{s0}$ if i=0 or the input $H_{si}$ if i>1. If step 133 determines that $H'_{si}$ is unequal to $H_{si}$ then step 134 is executed wherein step 134 announces that an integrity failure has occurred. If step 133 determines that $H'_{si}=H_{si}$ then step 135 is next executed.

Step 135 calculates:

$$S(i+1)=\text{Hash}(S(i))$$

Step 136 ascertains whether to exit the loop by determining whether i>N. If step 136 determines that i does not exceed N, then step 137 is executed to increment i by 1, followed by looping back to step 132 to perform the next iteration of the loop. If step 136 determines that i>N, then the loop is exited and step 138 is next performed.

Step 138 determines whether S(N+1) equals s(N+1), wherein S(N+1) was calculated in step 135 of the last iteration of the loop, and wherein s(N+1) is obtained from the database 15. If step 138 determines that S(N+1) does not equal s(N+1) then step 139 is executed wherein step 139 announces that an integrity failure has occurred. If step 138 determines that S(N+1)=s(N+1) then the verification by the user 19 ends.

For the purpose of security, the application firewall 16 prevents all communication between the software 13 and the vendor 18 and ensures that only the feedback module 14 is allowed to communicate with the vendor 18. Hence, the software 13 cannot send arbitrary entries without the arbitrary entries getting recorded by the feedback module 14. The feedback module 14 maintains all of the feedback entries sent to the vendor18 in the database 15 so that the feedback entries can be verified by the user19 at any time. Different keys are used for encrypting and verifying each feedback entry. Each key is derived from the previous key, but given a key, its previous version cannot be found since a one way hash function is used to derive newer keys. At the time of intrusion, the intruder has access only to the latest values of the keys k(i+1), n(i+1) and s(i+1). All communication between the feedback module 14 and vendor 18 is encrypted using k(i) which is not known to others. Since there is no way for the intruder to derive previous values of the keys, the intruder cannot forge or read or delete previous feedback entries that were created prior to the intrusion. Note that two verification keys (n(0) and s(0)) are used, one verification key for the vendor 18 and the other verification key for the user 19, which ensures that if the vendor 18 becomes the intruder, the user 19 can still locate any forgery.

Figure 11:
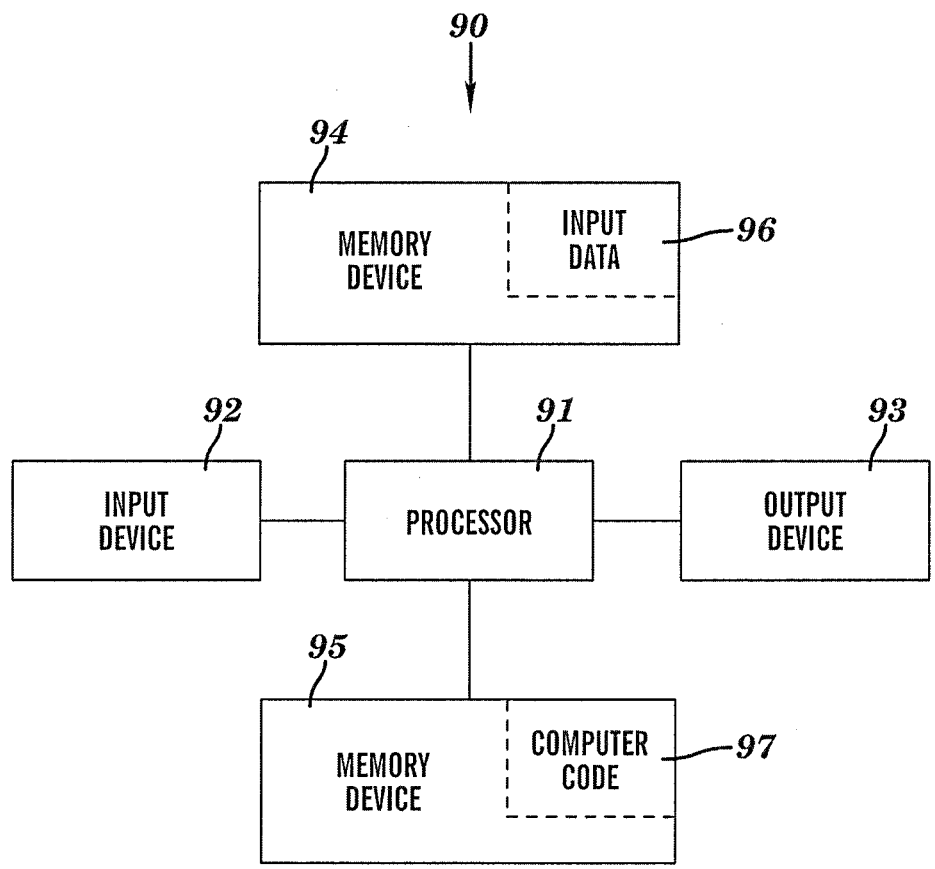
FIG. 11 illustrates a computer system used for processing feedback entries received from software provided by a vendor to an end user machine, in accordance with embodiments of the present invention.

FIG. 11 illustrates a computer system 90 used for processing feedback entries received from software provided by a vendor to an end user machine, in accordance with embodiments of the present invention. Either or both of the end user machine 12 and the computer system of the vendor 18 of FIG. 1 may comprise the computer system 90 of FIG. 11.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97.

The computer code 97 includes an algorithm for processing feedback entries received from software provided by a vendor to an end user machine. The computer code 97 may represent the feedback module 14 of FIG. 1 if the end user machine 12 comprises the computer system 90. The computer code 97 may represent software of the vendor 18 if the computer system of the vendor 18 comprises the computer system 90.

The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for processing feedback entries received from software provided by a vendor to an end user machine.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing feedback entries received from software, said software provided by a vendor device to an end user machine, said end user machine comprising a processor, the software, a feedback module, and a database, wherein a concatenation operator ∥ is defined such that A∥B denotes a concatenation of strings A and B, wherein E(K,X) defines a symmetric key encryption of a parameter X using a key K, wherein Hash(Y) defines a one way hash function of a parameter Y, and wherein said method comprises:

said processor via execution of the feedback module, establishing a secret key $k(0)$ and sending the key $k(0)$ to the vendor device and communicating the key $k(0)$ to a user of the software;

said processor via execution of the feedback module, establishing a secret key $n(0)$ and sending the key $n(0)$ to the vendor device and not communicating the key $n(0)$ to the user;

said processor, via execution of the feedback module, generating a secret key $s(0)$ and communicating the generated key $s(0)$ to the user but not to the vendor device;

said processor, via execution of the feedback module, generating an encryption $E_{k0}$ of an identification tag FE(0) using the secret key $k(0)$ where $E_{k0}=E(k(0),FE(0))$;

said processor, via execution of the feedback module, generating a parameter $H_{n0}$ using the secret key $n(0)$ where $H_{n0}=Hash(n(0)\|E_{k0})$;

said processor, via execution of the feedback module, generating a parameter $H_{s0}$ using the secret key $s(0)$ where $H_{s0}=Hash(s(0)\|E_{k0})$;

said processor, via execution of the feedback module, sending $E_{k0}$, $H_{n0}$, and $H_{s0}$ to the database;

said processor, via execution of the feedback module, receiving N feedback entries, denoted as FE(1), . . . , FE(N), from the software;

said processor, via execution of the feedback module, generating an encryption E(k(i),FE(i)), denoted as $E_{ki}$, of feedback entry FE (i) using an encryption key k(i) and writing $E_{ki}$ to the database for each of i=1, . . . , N; and said processor, via execution of the feedback module, determining that synchronization is required and a network connection is available and in response, synchronizing the database with the vendor device by sending $E_{ki}$ to the vendor device for each of i=1, . . . , N.

2. The method of claim 1, said method further comprising:

said processor, via execution of the feedback module, sending $E_{k0}$ and $H_{n0}$ to the vendor device.

3. The method of claim 2, said method comprising:

said processor, via execution of the feedback module, generating keys $k(1)$, $n(1)$, and $s(1)$ such that $k(1)=Hash(k(0))$, $n(1)=Hash(n(0))$, and $s(1)=Hash(s(0))$; and said processor, via execution of the feedback module, sending $k(1)$, $n(1)$, and $s(1)$ to the database.

4. The method of claim 3, said method comprising, for each of i=1, . . . , N wherein N is at least 1:

calculating parameters $H_{ni}$ and $H_{si}$ such that $H_{ni}=Hash(n(i)\|E_{ki})$, and $H_{si}=Hash(s(i)\mu E_{ki})$;

writing $H_{ni}$ and $H_{si}$ to the database;

said processor, via execution of the feedback module, generating keys k(i+1), n(i+1), and s(i+1) such that k(i+1)=Hash(k(i)), n(i+1)=Hash(n(i)), and s(i+1)=Hash(s(i)); and replacing keys k(i), n(i), and s(i) in the database with keys k(i+1), n(i+1), and s(i+1), wherein the database comprises k(N+1), n(N+1), and s(N+1).

5. The method of claim 4, said synchronizing comprising sending to the vendor device: ($E_{ki}$, $H_{ni}$, i=M, . . . , N) and E(k(N−1), n(N−1)), wherein 1≤M≤N.

6. A The method of claim 5, further comprising verifying, by the vendor device, an integrity of the N feedback entries received by the vendor device as a result of said sending to the vendor device: (($E_{ki}$, $H_{ni}$), i=M, . . . , N) and E(k(N+1), n(N+1)), wherein 1≤M≤N.

7. The method of claim 6, wherein said verifying comprises:

setting i=0 and H(0)=n(0);

executing iterations i=0, 1, . . . , N of a loop, wherein executing each iteration i of the loop comprises: setting $H'_{ni}=Hash(H(i)\|E_{ki})$; determining that $H'_{ni}=H_{ni}$; and responsive to said determining that $H'_{ni}=H_{ni}$, setting H(i+1)=Hash(H(i)) and k(i+1)=Hash(k(i));

after said executing:

decrypting E(k(N+1), n(N+1)) using key k(N+1) to infer n(N+1);

determining that n(N+1)=H(N+1); and responsive to said determining that n(N+1)=H(N+1), ascertaining that the integrity of the N feedback entries received by the vendor device has been verified.

8. The method of claim 6, wherein the method further comprises, as performed by the vendor device prior to said verifying:

calculating $H'_{n0}$=Hash(n(0)||$E_{k0}$);

determining that $H'_{n0}$=$H_{n0}$; and responsive to said determining that $H'_{n0}$=$H_{n0}$, decrypting $E_{k0}$ to infer FE(0) and recording that the database is set.

9. The method of claim 4, said method comprising verifying, by the processor, an integrity of the N feedback entries in the database as a result of writing (($E_{ki}$, $H_{ni}$, $H_{si}$), i=1, . . . , N) to the database.

10. The method of claim 9, wherein said verifying comprises:

setting i=0 and S(0)=s(0);

executing iterations i=0, 1, . . . , N of a loop, wherein executing each iteration i of the loop comprises: setting $H'_{si}$=Hash(S(i)||$E_{ki}$); determining that $H'_{si}$=$H_{si}$; and responsive to said determining that $H'_{si}$=$H_{si}$, setting S(i+1)=Hash(S(i));

after said executing:

determining that S(N+1)=s(N+1); and responsive to said determining that S(N+1)=s(N+1), ascertaining that the integrity of the N feedback entries in the database has been verified.

11. A computer program product, comprising a non-volatile computer readable storage medium having a computer readable program code stored therein, said computer readable program code, upon being executed by a processor, causes the processor to perform a method for processing feedback entries received from software, said software provided by a vendor to an end user machine, said end user machine comprising the processor, the software, a feedback module, and a database, wherein a concatenation operator || is defined such that A||B denotes a concatenation of strings A and B, wherein E(K,X) defines a symmetric key encryption of a parameter X using a key K, wherein Hash(Y) defines a one way hash function of a parameter Y, and wherein said method comprises:

said processor via execution of the feedback module, establishing a secret key k(0) and sending the key k(0) to the vendor device and communicating the key k(0) to a user of the software;

said processor via execution of the feedback module, establishing a secret key n(0) and sending the key n(0) to the vendor device and not communicating the key n(0) to the user;

said processor, via execution of the feedback module, generating a secret key s(0) and communicating the generated key s(0) to the user but not to the vendor device;

said processor, via execution of the feedback module, generating an encryption $E_{k0}$ of an identification tag FE(0) using the secret key k(0) where $E_{k0}$=E(k(0),FE(0));

said processor, via execution of the feedback module, generating a parameter $H_{n0}$ using the secret key n(0) where $H_{n0}$=Hash(n(0)||$E_{k0}$);

said processor, via execution of the feedback module, generating a parameter $H_{s0}$ using the secret key s(0) where $H_{s0}$=Hash(s(0)||$E_{k0}$);

said processor, via execution of the feedback module, sending $E_{k0}$, $H_{n0}$, and $H_{s0}$ to the database;

said processor, via execution of the feedback module, receiving N feedback entries, denoted as FE(1), . . . , FE(N), from the software;

said processor, via execution of the feedback module, generating an encryption E(k(i),FE(i)), denoted as $E_{ki}$, of feedback entry FE(i) using an encryption key k(i) and writing $E_{ki}$ to the database for each of i=1, . . . , N; and said processor, via execution of the feedback module, determining that synchronization is required and a network connection is available and in response, synchronizing the database with the vendor device by sending $E_{ki}$ to the vendor device for each of i=1, . . . , N.

12. The computer program product of claim 11, said method further comprising:

said processor, via execution of the feedback module, sending $E_{k0}$ and $H_{n0}$ to the vendor device.

13. A computer system comprising an end user machine, wherein the end user machine comprises a processor, a memory coupled to the processor, a computer readable storage device comprising hardware, software, a feedback module, and a database, wherein the storage device is coupled to the processor and contains program code which, upon being executed by the processor via the memory, causes the processor to perform a method for processing feedback entries received from the software, wherein the software is provided by a vendor to an end user machine, wherein a concatenation operator || is defined such that A||B denotes a concatenation of strings A and B, wherein E(K,X) defines a symmetric key encryption of a parameter X using a key K, wherein Hash(Y) defines a one way hash function of a parameter Y, and wherein said method comprises:

said processor via execution of the feedback module, establishing a secret key k(0) and sending the key k(0) to the vendor device and communicating the key k(0) to a user of the software;

said processor via execution of the feedback module, establishing a secret key n(0) and sending the key n(0) to the vendor device and not communicating the key n(0) to the user;

said processor, via execution of the feedback module, generating a secret key s(0) and communicating the generated key s(0) to the user but not to the vendor device;

said processor, via execution of the feedback module, generating an encryption $E_{k0}$ of an identification tag FE(0) using the secret key k(0) where $E_{k0}$=E(k(0),FE(0));

said processor, via execution of the feedback module, generating a parameter $H_{n0}$ using the secret key n(0) where $H_{n0}$=Hash(n(0)||$E_{k0}$);

said processor, via execution of the feedback module, generating a parameter $H_{s0}$ using the secret key s(0) where $H_{s0}$=Hash(s(0)||$E_{k0}$);

said processor, via execution of the feedback module, sending $E_{k0}$, $H_{n0}$, and $H_{s0}$ to the database;

said processor, via execution of the feedback module, receiving N feedback entries, denoted as FE(1), . . . , FE(N), from the software;

said processor, via execution of the feedback module, generating an encryption E(k(i), FE(i) denoted as $E_{ki}$, of feedback entry FE(i) using an encryption key k(i) and writing $E_{ki}$ to the database for each of i=1, . . . , N; and said processor, via execution of the feedback module, determining that synchronization is required and a network connection is available and in response, synchronizing the database with the vendor device by sending $E_{ki}$ to the vendor device for each of i=1, ..., N.

14. The computer system of claim 13, said method further comprising:

said processor, via execution of the feedback module, sending $E_{k0}$ and $H_{n0}$ to the vendor device.

* * * * *